Figure 1:
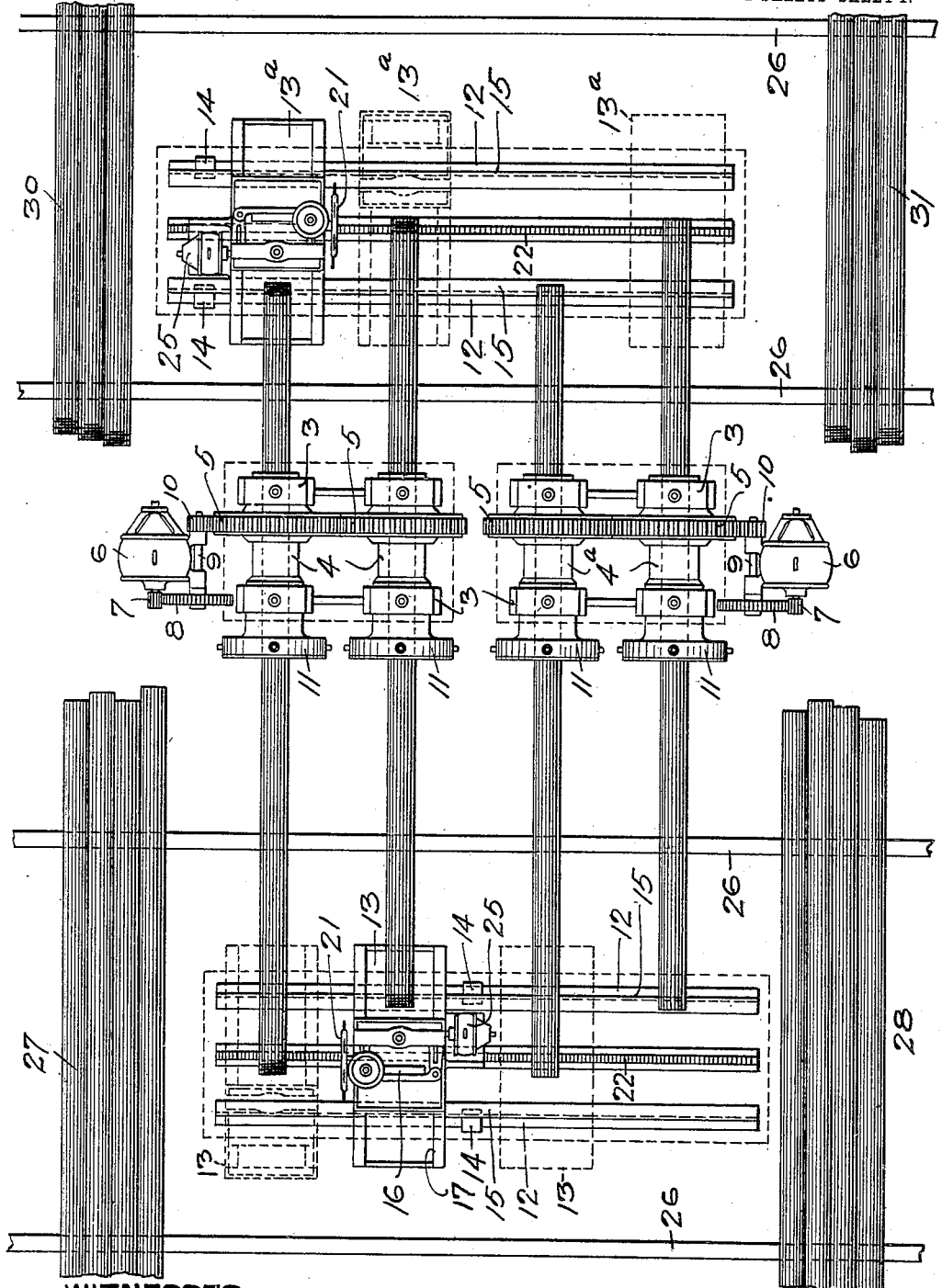

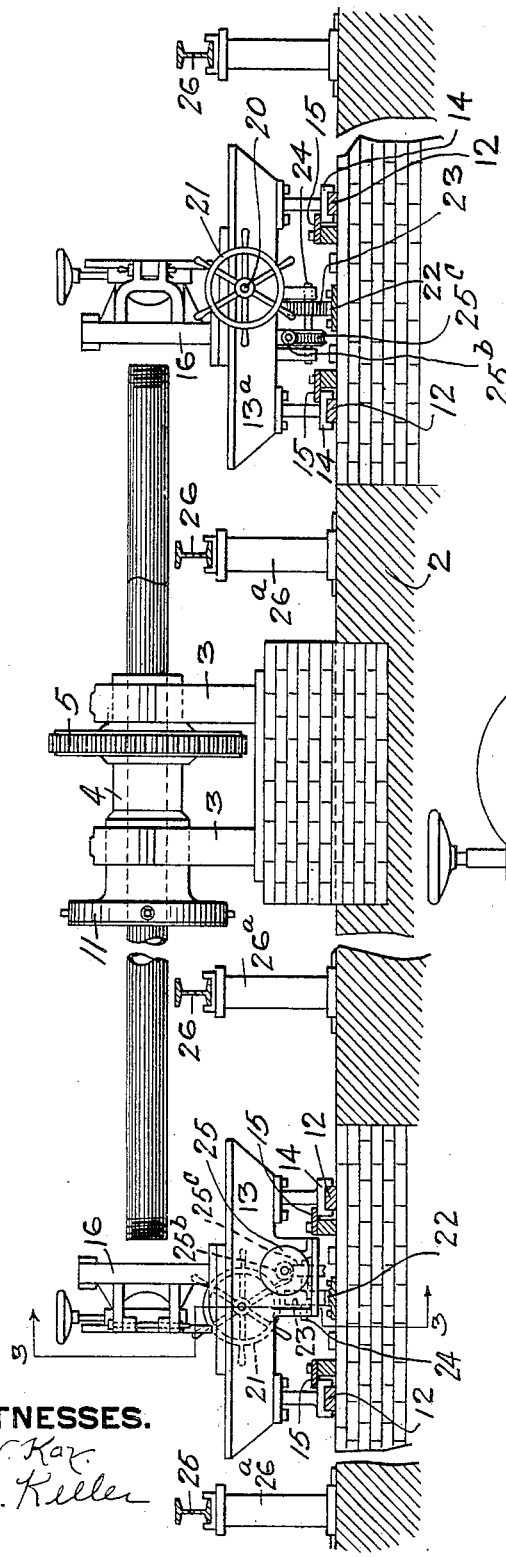
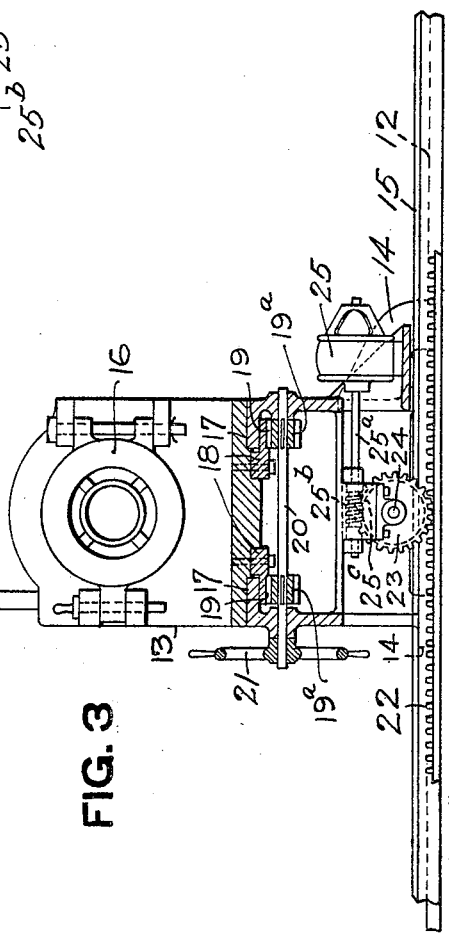

UNITED STATES PATENT OFFICE.

HARRY E. GROSS, OF KNOXVILLE, PENNSYLVANIA, ASSIGNOR OF ONE-HALF TO WALTER H. ARRAS, OF PITTSBURG, PENNSYLVANIA.

THREADING-MACHINE.

979,152.  Specification of Letters Patent.  Patented Dec. 20, 1910.

Application filed April 18, 1910. Serial No. 556,236.

*To all whom it may concern:*

Be it known that I, HARRY E. GROSS, a resident of Knoxville, in the county of Allegheny and State of Pennsylvania, have invented a new and useful Improvement in Threading-Machines; and I do hereby declare the following to be a full, clear, and exact description thereof.

My invention relates to threading machines for cutting threads on a pipe, tube or other article which is round in cross-section.

The object of my invention is to provide a form of apparatus by means of which both ends of the pipe may be threaded without changing the position of the pipe in the holding chuck, thereby doing away with the extra handling of the pipe and reducing the time required for threading, and at the same time providing a machine in which the manual labor required in the handling of the pipe is reduced to a minimum and the output greatly increased.

To these ends my invention comprises, generally stated, a plurality of rotary-chucks arranged side by side, and a transversely movable threading die at opposite ends of said chucks, and means for moving said threading dies into position for operation in connection with the pipes held within said chucks, whereby said dies operate simultaneously, the one on the end of one pipe and the other on the opposite end of the other pipe, all as fully hereinafter set forth and claimed.

In the accompanying drawings. Figure 1 is a plan view of my improved threading apparatus; Fig. 2 is an enlarged side elevation partly broken away; and Fig. 3 is a section on the line 3—3 Fig. 2.

Referring to the drawings, the numeral 2 designates a suitable base or foundation of brick work or concrete, as may be desirable, and mounted on the raised portion of said bed are the housings 3. These housings form bearings for the rotary-barrels 4, 4$^a$. These barrels are provided with the gears 5 and said barrels are driven in pairs by means of the motors 6. The motor-shaft has the pinion 7 which meshes with the gear-wheel 8 on the shaft 9, and the pinion 10 on said shaft 9 meshes with one of the gear-wheels 5. While I have illustrated my invention in one of the preferred forms where there are two sets of barrels geared in pairs as indicated, I do not wish to limit myself in any way to this particular arrangement, as any number of barrels may be employed and may be driven independently.

The barrels are provided with the chucks 11 which may be of any suitable construction for clamping or holding the pipe securely within the barrels.

Extending transversely of the barrels is the track or guideway 12 which supports the carriages 13, 13$^a$. The carriages are provided with the channels 14 which engage the guides 12, and in order to prevent the tilting or upward movement of the carriages in operation, guard-flanges 15 engage the upper faces of the channels 14. The carriages 13 carry the die-holders 16 which support suitable dies of a common construction and it has not been deemed necessary to illustrate or describe the same in detail. The die-holders 16 are arranged to be moved along the carriages 13, 13$^a$ and said die-holders engage the guides 17 on said carriages. The die-holders are further provided with the rack-bars 18, with the teeth 19 formed therein, and pinions 19$^a$ on the shafts 20 are adapted to engage the teeth of said rack bars 18. The shaft 20 is journaled in the carriage 13 and secured to the outer end of said shaft is the hand-wheel 21 by means of which the die-holder is moved back and forth on the carriage 13 to bring it into position to engage the end of the pipe to be threaded, as fully hereinafter set forth.

The carriages 13, 13$^a$ are movable on the guides 12 and to provide for this movement I employ the rack-bar 22 with which the gear 23 is adapted to engage. The gear 23 is mounted on the shaft 24. The shaft 25$^a$ of the motor 25 has the worm 25$^b$ which engages the worm 25$^c$ on the shaft 24.

The skids 26 are supported on the uprights 26$^a$, and arranged to deliver the pipe to the machine and to transfer the same therefrom after the threading operation.

In threading pipe with my improved apparatus, the pipe before being threaded is arranged as at 27 and 28 at opposite sides of the machine, and the carriages carrying the dies are moved over on the tracks 12 to a position clear of the first pair of barrels 4. Two pipes are then rolled from the pile 27 down the skids 26 so as to bring the said pipes into position with reference to the barrels 4 when the pipes are inserted in said barrels and clamped securely therein by the chucks 11. The carriages 13, 13ª carrying the dies are then moved over into alinement with the pipes, the carriage 13 in line with the end of one pipe and the carriage 13ª in line with the end of the opposite end of the other pipe, when the operators turning the hand-wheels 21 move the dies up into position to engage the ends of the pipes as indicated in full lines Fig. 1. The power is then applied to rotate the barrels 4, and the pipes carried thereby, whereupon the threading of the pipes is accomplished, the die-holders being moved in their guides toward the barrels until the right amount of thread has been formed on the pipe. It will be apparent from the construction illustrated that the direction of the rotation of the barrels 4 when geared up as described to rotate in opposite directions will form a right-hand thread on the pipes, as indicated in Fig. 1. When the threading of one end of each of the pipes has been accomplished, the rotation of the barrels 4 is stopped, and the operators, by means of the hand-wheels 21 withdraw the die-holders, whereupon the power is applied to move the carriages 13, 13ª over into the position indicated in dotted lines Fig. 1, and the dies are then moved into position to engage the pipes, and the pipes are threaded at the other ends. When the pipes have been threaded at both ends, the carriages 13, 13ª are drawn to one side and the pipes drawn out of the right-hand end of the barrels 4, whereupon they roll down the skids 25 to the piles 30 and 31. In the meantime pipes are fed from the piles 28 and secured in the barrels 4ª and the threading of these pipes is done in the same manner as above set forth. The direction of the rotation of the barrels is reversed so as to give a right hand thread to the pipes. By arranging the barrels in pairs in this manner, a single threading device at each end does all of the threading, and while the pipes are being removed from one pair of blanks, the threading is being done in the other pairs.

It will be apparent from the above, the operation of threading the pipes is greatly facilitated by not having to remove the pipes from the barrels until both ends have been threaded, which is made possible by moving the die-holders transversely of the barrels, as illustrated, so that one end of each pipe is being threaded at the same time. By such an arrangement also a right hand thread is being formed on each pipe, each pair of barrels being geared up and driven by the same source of power.

By my improved machine, I am enabled to greatly reduce the amount of steps required by having machines arranged in such a position that no reversal of the pipe is required for the threading operation, and at the same time I reduce the amount of manual labor required in handling the pipe, so that the capacity of the machine is greatly increased.

It is apparent that there may be many different arrangements and modifications of my invention without in any way affecting the broad principle, and I do not wish to limit myself in any way to the particular form of apparatus illustrated and described.

What I claim as my invention is:

1. In threading-machines, the combination of a plurality of rotary-holders, means for rotating same, and a transversely movable threading device at one end of each of said holders.

2. In threading-machines, the combination of a plurality of rotary holders, means for rotating said holders in opposite directions, and a transversely movable threading device at one end of each of said holders.

3. In threading-machines, the combination of a plurality of rotary-holders, means for rotating same, transversely movable carriages at one end of each of said holders, and movable threading devices carried thereby.

4. In threading-machines, the combination of a plurality of rotary-holders, gears on said holders meshing with each other, means for driving one of said holders, and a transversely movable threading device at one end of each of said holders.

In testimony whereof, I, the said HARRY E. GROSS have hereunto set my hand.

HARRY E. GROSS.

Witnesses:
HALLOCK C. SHERRARD,
ROBT. D. TOTTEN.